US011283844B2

(12) United States Patent
Lal

(10) Patent No.: US 11,283,844 B2
(45) Date of Patent: Mar. 22, 2022

(54) METHOD AND SYSTEM FOR PARTICIPATING IN AN ELECTRONIC COMMUNICATION USING VIRTUAL PRESENCE

(71) Applicant: Mitel Networks Corporation, Ottawa (CA)

(72) Inventor: Sachin Kumar Lal, Bengaluru (IN)

(73) Assignee: Mitel Networks Corporation, Ottawa (CA)

(*) Notice: Subject to any disclaimer, the term of this patent is extended or adjusted under 35 U.S.C. 154(b) by 258 days.

(21) Appl. No.: 15/832,326

(22) Filed: Dec. 5, 2017

(65) Prior Publication Data
US 2019/0173926 A1 Jun. 6, 2019

(51) Int. Cl.
*G06F 15/16* (2006.01)
*H04L 65/403* (2022.01)
*H04L 65/10* (2022.01)
*H04L 67/55* (2022.01)
*H04L 65/1069* (2022.01)
*H04L 12/18* (2006.01)

(52) U.S. Cl.
CPC ............ *H04L 65/403* (2013.01); *H04L 12/18* (2013.01); *H04L 65/1006* (2013.01); *H04L 65/1069* (2013.01); *H04L 67/26* (2013.01)

(58) Field of Classification Search
CPC ... H04L 65/403; H04L 65/1006; H04L 67/26; H04L 65/1069; H04L 12/18
See application file for complete search history.

(56) References Cited

U.S. PATENT DOCUMENTS

| 9,055,192 | B1* | 6/2015 | Mallappa | H04N 7/155 |
| 2007/0005691 | A1* | 1/2007 | Pushparaj | H04M 3/42221 709/204 |
| 2007/0260685 | A1* | 11/2007 | Surazski | G06Q 10/10 709/204 |
| 2007/0276908 | A1 | 11/2007 | Asthana et al. | |
| 2007/0286101 | A1* | 12/2007 | Gagne | H04L 12/66 370/260 |
| 2011/0107236 | A1* | 5/2011 | Sambhar | H04L 12/1827 715/753 |
| 2012/0150956 | A1 | 6/2012 | Tucker et al. | |
| 2014/0365921 | A1* | 12/2014 | Gupta | H04L 67/38 715/758 |
| 2016/0134570 | A1 | 5/2016 | Yin et al. | |
| 2016/0182580 | A1* | 6/2016 | Nayak | H04L 69/28 709/204 |
| 2018/0337963 | A1* | 11/2018 | Faulkner | H04L 67/26 |

FOREIGN PATENT DOCUMENTS

WO  WO 2013/0184723 A1  12/2013

* cited by examiner

*Primary Examiner* — Suraj M Joshi
*Assistant Examiner* — Jaren Means

(57) ABSTRACT

Systems and methods for virtual conferencing that allow a missing participant to provide information to active participants in a conference session in real time are disclosed. The systems and methods can be used to allow a missing participant to respond to queries submitted in a query bucket by one or more active participants. Responses provided by the missing participant can be viewed by active participants during the virtual conference session.

18 Claims, 5 Drawing Sheets

METHOD AND SYSTEM FOR PARTICIPATING IN AN ELECTRONIC COMMUNICATION USING VIRTUAL PRESENCE

FIELD OF THE INVENTION

The present disclosure generally relates to methods and systems for electronic communication. More particularly, the disclosure relates to methods and systems that use virtual presence to allow a participant to participate in an electronic communication.

BACKGROUND OF THE DISCLOSURE

Electronic communications, such as audio and video conference sessions are often used to allow participants in various locations to "virtually" participate in a conference in real time. Such communications allow participants in different locations to participate in discussion without having to travel to a common location.

Conference sessions are often used to discuss issues of interest and/or to obtain a desired objective. Often, certain invitees to a conference are considered stakeholders, who are knowledgeable about the topics of discussion of the conference, or who will take action based on the discussion during the conference. Indeed, some invitees can be considered required participants. For example, a participant can be deemed a required participant if they have particular knowledge about a subject or will take particular action based on the discussion during a conference.

Unfortunately, not all invitees may be available at a time when a conference session is scheduled. For example, a conference invitation may be declined by an invitee because of a conflict in schedule. Additionally or alternatively, an invitee to a conference may accept an invitation to participate in the conference session, but then forget to join, join late, or may not be able to join the conference session due to technical problems—e.g., a suitable conference connection is not available. Still further, during a conference, it may be determined that information is desired from someone that was not initially invited to participate in the conference.

In cases in which a participant deemed a required participant declines an invitation—e.g., due to a conflict or other circumstance, the conference would generally be rescheduled. This may be problematic, because rescheduling the conference means that all invitees will have to check their schedules again, determine whether they are available, and respond to the invitation.

In cases in which a conference is in process and information is desired from someone that is not a participant to a conference, an active participant in the conference may try to call, text, or otherwise communicate with the missing participant to obtain the desired information and then share that information with the active participants in the conference session. Reaching out to a person that is not an active participant in the conference session can dilute the focus of participants to the conference session, and can cause unwanted delay in hearing the response from the non-active participant. In addition, context of information provided from the non-active participant to an active participant and then to the rest of the participants may be lost as the information is relayed via the active participant.

Accordingly, improved methods and system for conferencing are desired. In particular, improved techniques for reaching out to and receiving information from non-active participants during a conference session are desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide systems and methods for electronic communications, such as video and/or audio conference sessions (sometimes referred to simply as conference) that allow a missing participant to provide information to active participants in real time. The systems and methods can be used to allow a conference to proceed, even when one or more persons with information deemed important may not be able to be an active participant in the conference for part of all of the conference session.

Figure 1:
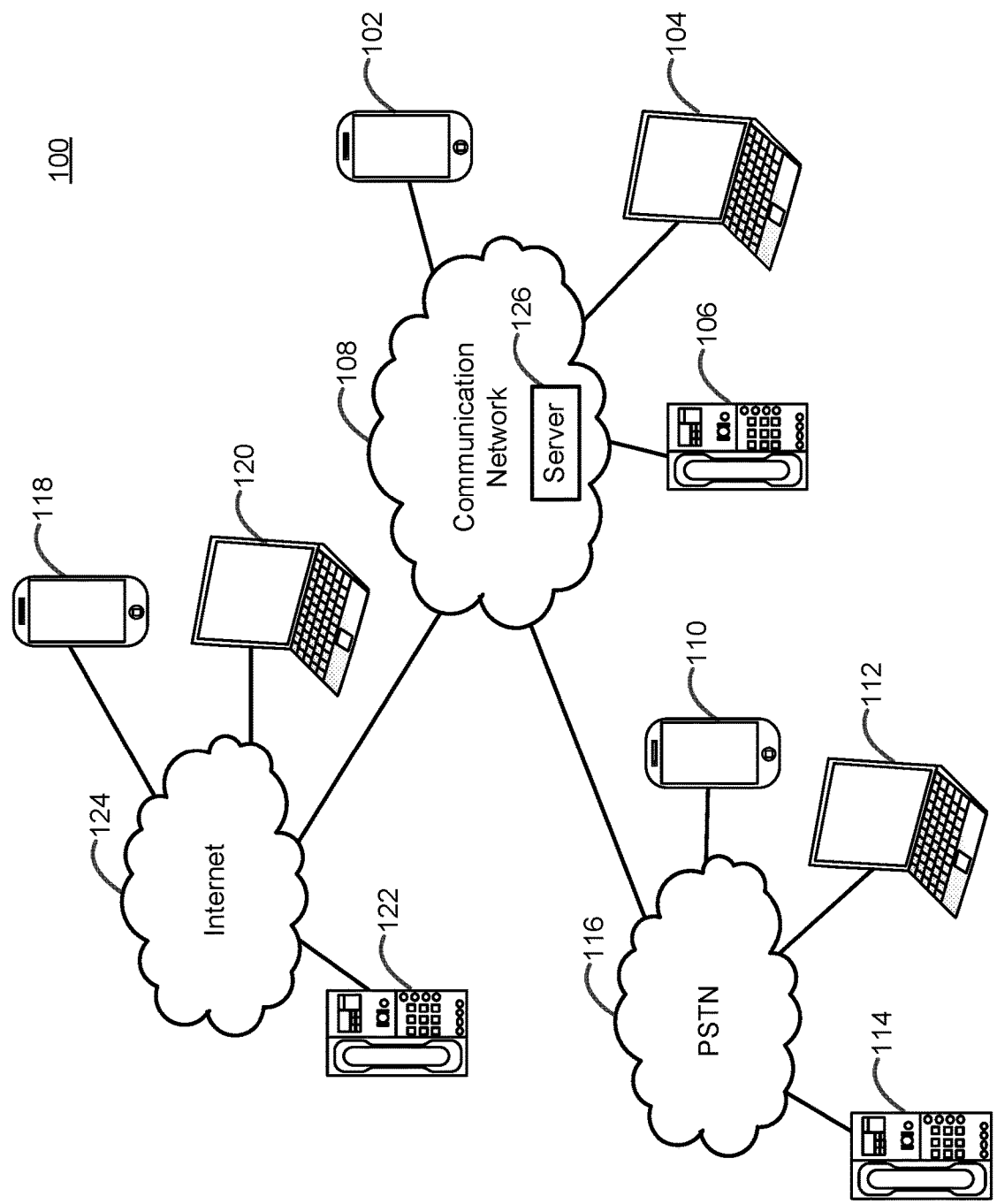
FIG. 1 illustrates a communication system in accordance with exemplary embodiments of the disclosure.

Turing now to the figures, FIG. 1 illustrates a communication system 100 in accordance with various embodiments of the disclosure. Communication system 100 includes one or more devices 102-106 coupled to a communication network 108. In the illustrated example, communication system 100 also includes devices 110-114 coupled to a public switched telephone network (PSTN) 116 and devices 118-122 coupled to the Internet 124. Unless otherwise noted devices 110-114 and 118-122 and PSTN 116 and the Internet 124 are not required to practice exemplary embodiments of the disclosure. Further, as set forth in more detail below, any of devices 102-106, 110-114, and 118-122 can be an active participant device, when such device is connected to an active conference session, or a missing participant device, when the device is not connected to a conference session for at least a portion of the conference session.

Devices 102-106, 110-114, and 118-122 can include any suitable device with wired or wireless communication (e.g., audio and/or video) features. For example, devices 102-106, 110-114, and 118-122 can include a wearable device, a tablet computer, a wired phone, a mobile phone, a personal (e.g., laptop or desktop) computer, a streaming device, such as a game console or other media streaming device, or the like. One or more devices 102-106, 110-114, and 118-122 can include an application or client to perform various functions set forth herein and/or to cause to be displayed a graphical user interface as described herein.

Communication network 108 can be, for example, an internet protocol (IP) network. Exemplary types of networks suitable for communication network 108 include a local area network, a wide-area network, a metropolitan area network, and wireless networks. Various components of network 112 can be coupled to one or more other components using an Ethernet connection, other wired connections, and/or wireless interfaces. As illustrated, communication network 108 can be coupled to other networks and/or to other devices typically coupled to networks. By way of particular example, communication network 108 include a private branch exchange (PBX). Communication network 108 can be coupled to the Internet 124 via a web portal and/or PSTN 116 via the gateway/SBC.

Communication network 108 includes a server 126. Server 126 can include or be a PBX 120 or other suitable telephone exchange or switching system/server that provides a connection between devices 102-106 (e.g., within an exchange) and optionally other devices, such as devices 110-114 and 118-122. Suitable PBX devices are available from Mitel Networks. The conference server can include suitable conferencing tools and modules and connect/bridge various participant devices to a conference, perform mixing of the media, and send media to the active an virtual participants to the conference. In accordance with exemplary embodiments of the disclosure, server 126 is a conference server configured to perform various functions, described in more detail in connections with FIGS. 3 and 4.

During a virtual conference session (sometimes referred to herein as conference session or conference), active participants participate in the conference using a server, such as server 126. For example, an application on server 126 can be used to connect devices that connect to a conference session, or server 126 can call/connect to users and their respective devices. In accordance with specific examples, during a conference session, active participants can use a web browser (or client or application) to stream meeting audio, view a meeting leader's shared desktop, view other participants' desktops, and/or virtually participate in the conference. Devices 102-106, 110-114, and 118-122 can include a client or application to facilitate participation in the conference. However, in accordance with at least some embodiments of the disclosure, no additional client or application is required on at least one device 102-106, 110-114 and 118-122 that participates in the conference. In accordance with examples of the disclosure, server 126 can determine whether one or more devices are an active participant device or a missing participant device.

Figure 2:
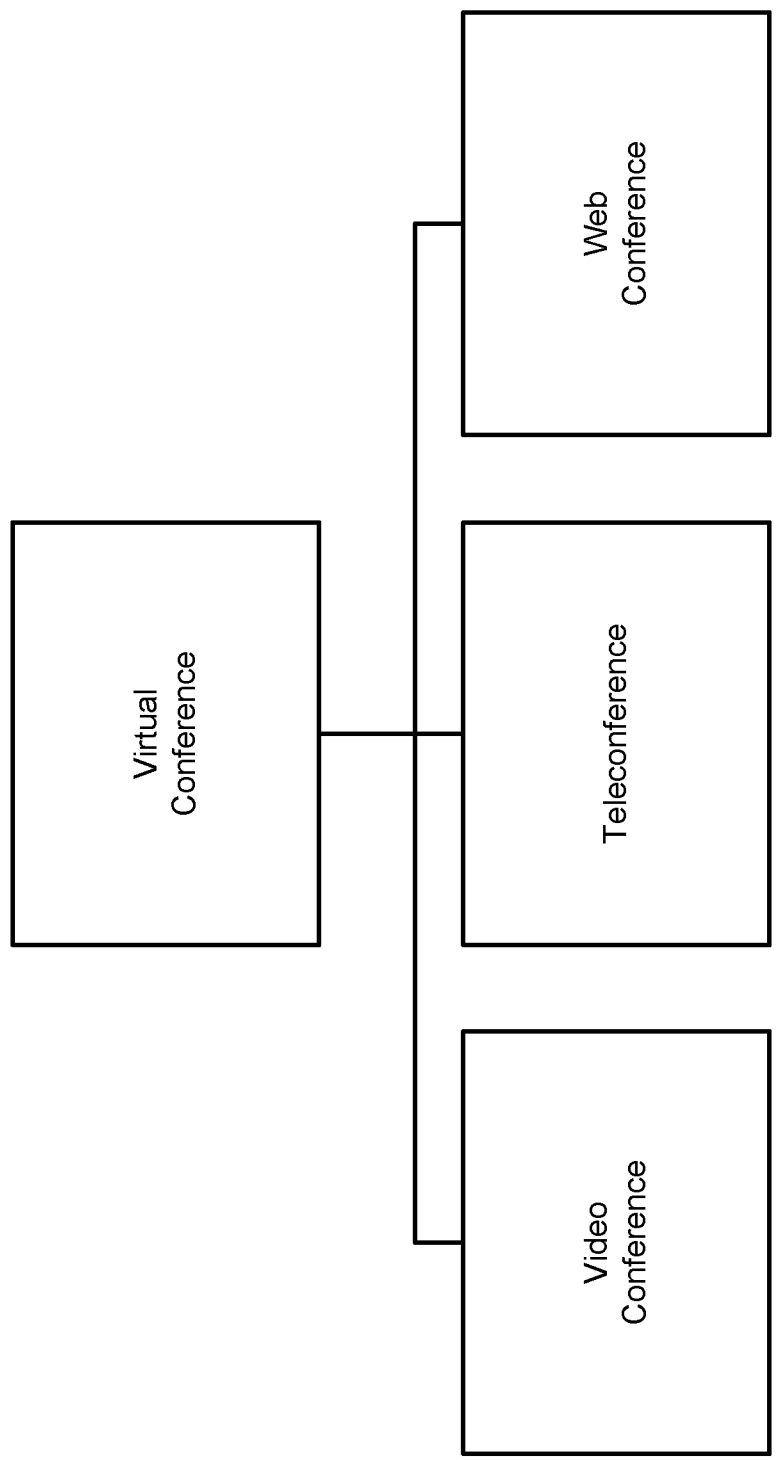
FIG. 2 illustrates exemplary forms of electronic communication suitable for use in connection with exemplary embodiments of the disclosure.

Communication systems, such as communication system 100 and methods described herein can be used in connection with various forms of electronic communications, such as virtual conferencing. FIG. 2 illustrates exemplary forms of virtual conferencing, including video conferencing, telephone conferencing, and web conferencing. One or more forms of virtual conferencing can be used by participants to a conference session as described herein.

Figure 3:
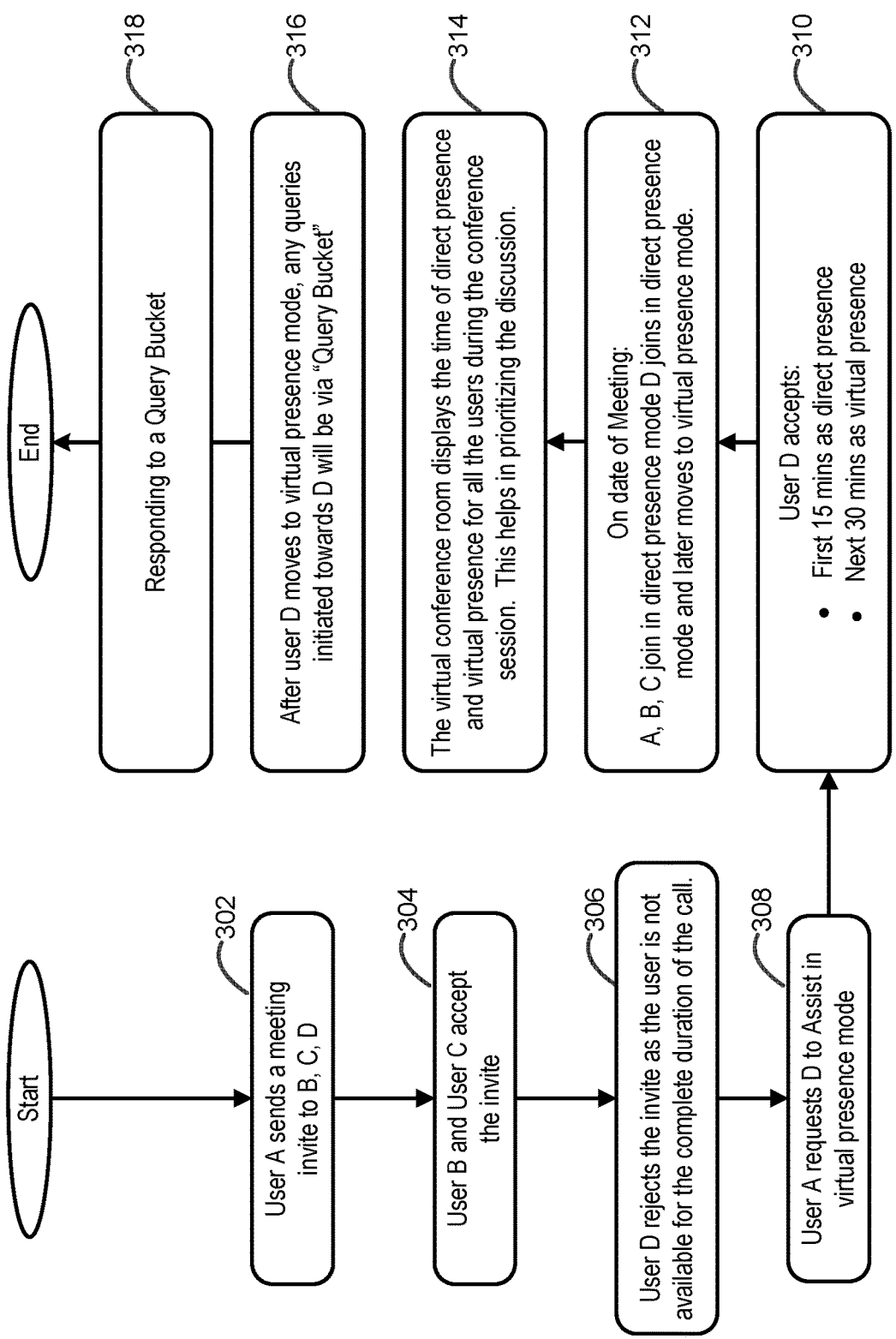
FIG. 3 illustrates a communication method in accordance with exemplary embodiments of the disclosure.

Exemplary communication systems and methods can be used to provide virtual conferencing to active participants to the conference and to one or more missing participants that are not active participants for at least a portion of the conference session. FIG. 3 illustrates a method 300, wherein at least one participant to a conference session is not an active participant for at least a portion of a conference session, and wherein the at least one participant participates in the conference session in a virtual presence mode, in accordance with at least one embodiment of the disclosure. As set forth in more detail below, a participant in virtual presence mode can respond to queries submitted to the virtual participant via one or more active participants in the virtual conference—e.g., during a conference session, using, for example, a graphical user interface as described below. A participant in virtual presence mode can participate in a plurality of conference sessions (e.g., differentiated via conference subject and/or conference identifier) in real time.

Method 300 includes the steps of sending an invitation to a virtual conference session to invitees (step 302), invitees accepting the invitation (step 304), one or more invitees indicating that they are not available for at least a portion of the conference (step 306), requesting an invitee to participate in the virtual conference session in virtual presence mode for at least a portion of the duration of the conference (step 308), responding to the request to participate in virtual presence mode (step 310), conducting the virtual conference session (step 312), displaying, during the conference session an indicium of when and/or for how long participants in virtual presence mode are available during the virtual conference session (step 314), sending a query using a query bucket to one or more participants participating in virtual presence mode (step 316), and responding to the query (step 318).

Sending an invitation to a virtual conference to invitees step 302 can include sending an invitation using, for example, email, text, short message service (SMS), or the like. The invitation can be sent by one or more participants and/or can be sent (e.g., automatically) using a server, such as server 126. For example, the server can be programmed to automatically invite certain participants to certain meetings. In the illustrated example, user A uses a participant device to send the invitation.

During invitees accepting the invitation step 304, one or more invitees that anticipate attending the virtual conference as an active participant respond by accepting the invitation set during step 302. One or more participant devices, such as devices 102-106, 110-114 and 118-122 can be used to accept the invitation. In the illustrated example, users B and C accept the invitation.

At one or more invitees indicating that they are not available for at least a portion of the conference step 306, one or more participants indicate that they will not be present during a least a portion of the virtual conference. The missing participant can use a client or application one a device (e.g., one of devices 102-106, 110-114 and 118-122) to send a response to a server and/or the other participants (e.g., the participant that initiated the invitation and/or other participants). In the illustrated case, user D rejects the invitation to attend the entire conference session as an active participant.

At requesting an invitee to participate in the virtual conference in virtual presence mode for at least a portion of the duration of the conference (step 308), one or more participants can request a missing participant to participate in a conference in virtual presence mode. Alternatively, a server, such as server 126 can automatically send an invitation to a participant to participate in virtual presence mode. In the illustrated example, user A requests user D to participate in virtual presence mode.

During responding to the request to participate in virtual presence mode step 310, the "missing" participant can indicate when he or she will and/or will not be available as an active participant and/or when he or she will be available in virtual presence mode. In the illustrated example, User D indicates that he/she will be available as an active participant for the first 15 minutes of the virtual conference session and for the next thirty minutes in virtual presence mode.

At step 312, the conference session is initiated and conducted. During the virtual conference session, participants can exchange information using, for example, voice over internet (VoIP), such as session initiation protocol (SIP), session description protocol (SDP), real-time transport protocol (RTP), binary floor control protocol (BFCP), or the like, for exchanging real time audio, video, and/or other content and/or use, for example HTTP for web applications. In the illustrated example, users A, B, and C are active participants for the entire conference session, user D is an active participant for a portion of the conference session, and then user D becomes a participant in virtual presence mode.

Figure 5:
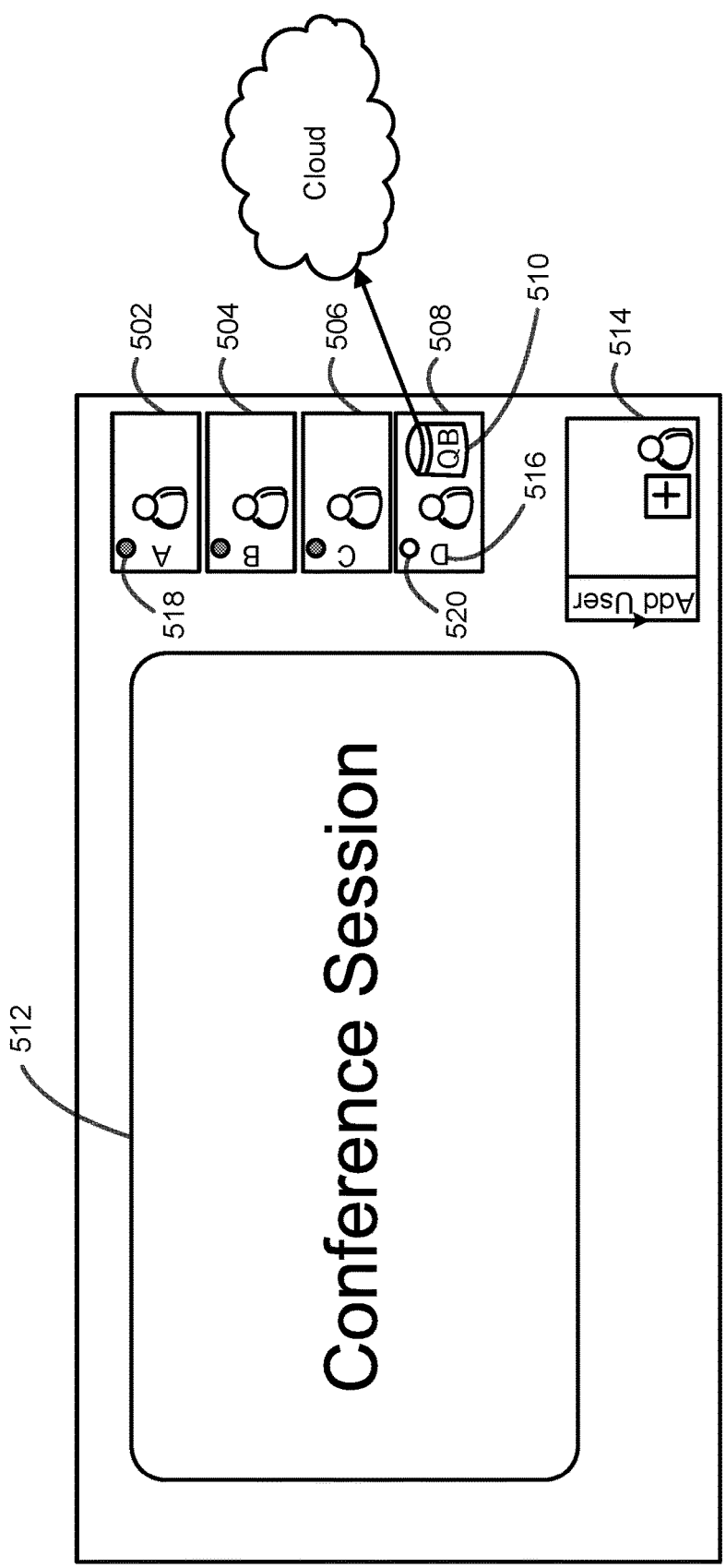
FIG. 5 illustrates a graphical user interface in accordance with exemplary embodiments of the disclosure.

During the conference session, an indicium of when and/or for how long participants in virtual presence mode are available during the virtual conference can be displayed. An exemplary graphical user interface 500 including an exemplary time indicium 516 suitable for step 314 is illustrated in FIG. 5.

When one or more participants to a conference session are participating in the conference in virtual presence mode, a message including a query bucket is pushed to the missing participant(s) in real time during step 316. In the illustrated example, a query bucket is pushed to user D.

Finally, any missing participants to a virtual conference can reply to a query bucket during the conference session (or afterwards, in which case answers to the queries could be retrieved by and/or pushed to participants at a later time) as illustrated by step 318. For example, a user can retrieve the query bucket using, e.g., a client or an application on a device, such as device 102-106, 110-114 and 118-122, to link to a site with the query bucket information. If the user's presence is visible to one or more other participants—e.g., via SIP, LDAP, or other suitable protocol, an instant message, email, or the like could be sent to the missing participant with a link to join the conference in virtual presence mode and/or to retrieve queries in a query bucket. Alternatively, an SMS could be pushed out to the missing participant using, for example, an SMS server. In this case, the message can contain a hyperlink to the query bucket. The missing participant can use the hyperlink to login and view the queries. Based on availability, the missing participant can decide to either call into the conference or reply back using one or more of text, a recorded audio/video message, and image(s). When the user replies, the user is actually assisting in virtual mode. Any reply from the missing participant can be visible to the active participants in real time, if the reply is sent during the virtual conference session.

A query bucket can be assigned to each participant who is or will be a part of a virtual conference session. During a virtual conference session, query buckets can be assigned to each invitee to the conference and optionally to users that were not invited to the virtual conference session. Any queries (i.e., information desired from a missing participant) can be added to a query bucket during the conference. A web interface link to the query bucket is then pushed out to the missing participant. As noted above, if the missing participant's presence is visible via SIP, LDAP, or the like, an instant message or email could be triggered to send a link to the query bucket to the missing participant, or an SMS can be pushed out using an SMS server. The missing participant can use the link to login and view the queries. Based on availability (e.g., as determined by a conference server), the missing participant can call into the conference or reply back in text, a recorded audio/video message, and/or image(s). Any reply from the missing participant can be visible to one or more (e.g., all) active participants during the conference session.

Since a missing participant may be assisting more than one conferences in virtual presence mode, a single (and only a single) query bucket may be allocated to each active and/or missing participant. Each conference can be differentiated by a "conference subject identifier."

Based on a current availability of the user (e.g., user may be physically present in front of laptop/computing device or user may be driving or user can be reached by SMS only), the missing participant can be notified of a pending query. Once the missing participant has been notified of a pending query in a query bucket, the missing participant can respond back to the active conference session participants using in the query bucket. In accordance with at least one example, the query bucket is maintained in the cloud (e.g., the conference server), such that the missing participant can respond from multiple forms of devices. If the queries go unanswered during the conference session, the query bucket can be automatically sent to the missing participant. In this case, when the missing participant does answer the query, all conference participants can have access to the reply.

In case the missing participant does not answer the queries because the missing participant will join the conference session, the query bucket can hold the outstanding queries until the missing participant becomes an active participant in the virtual conference. Whenever the missing participant joins, the now active participant can view the query bucket associated with that participant. The query bucket for the now active participant can open automatically as soon as the participant logs in. This allows the participant to get the context of the queries and be prepared with answers. The same context doesn't need to be repeated. Participants can additionally or alternatively use a flag to indicate that he/she now has an answer.

Figure 4:
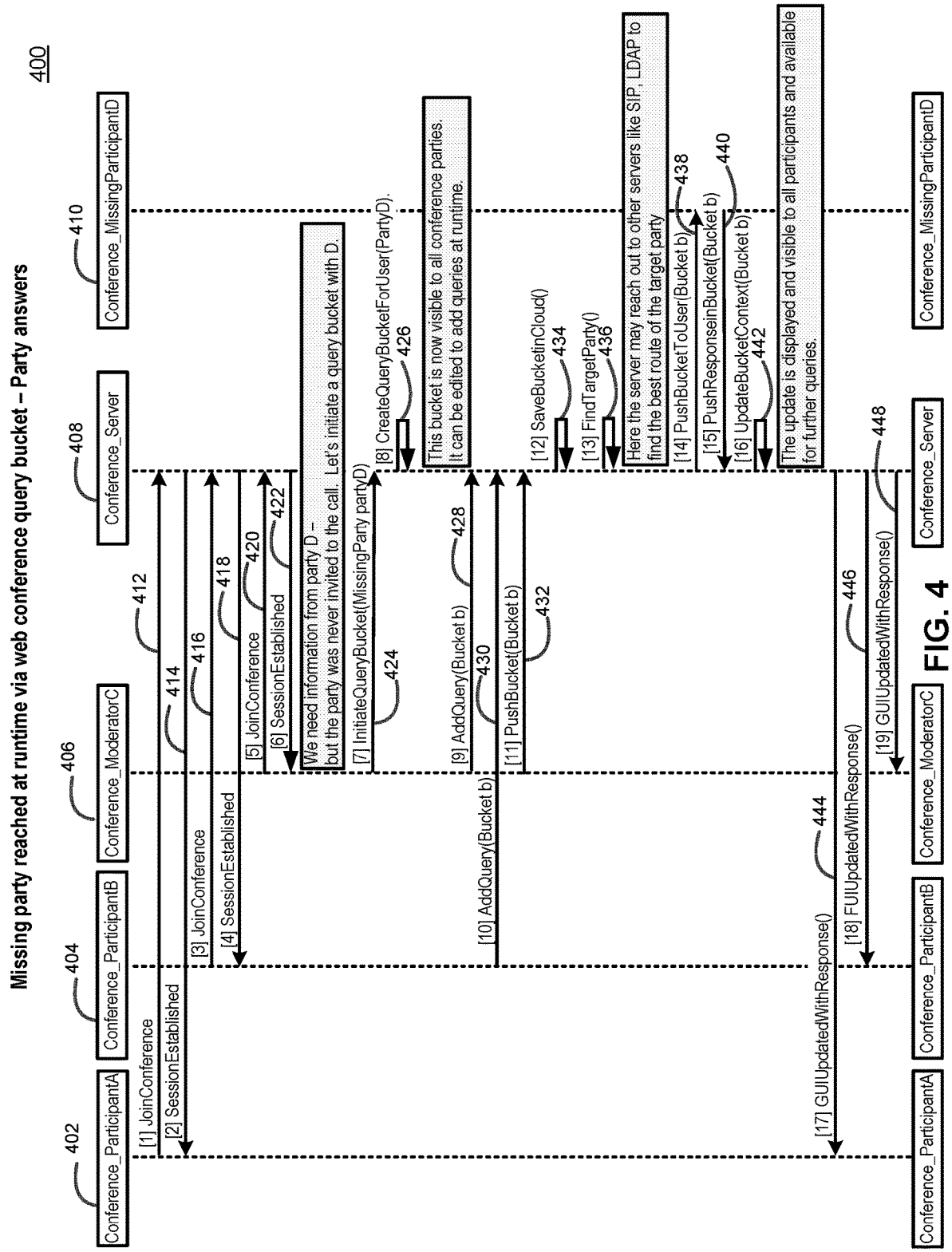
FIG. 4 illustrates a call flow in accordance with exemplary methods of the disclosure.

FIG. 4 illustrates a call flow diagram 400 in accordance with exemplary embodiments of the disclosure. The call flow illustrated in FIG. 4 can be used to reach missing participants to a conference session in real time, to send queries to the missing participants in real time during the conference session (without the missing participant being an active participant to the conference), and the active participants receiving responses from the missing participant in real time, without the missing participant joining or rejoining the conference session. The queries are initiated and sent by one or more active participants to the conference session and/or a missing participant in virtual presence mode. A response by the missing participant can be updated within the query context, allowing active participants to analyze the response to the query.

A conference session begins with participants 402-406 connecting to a conference session using their respective devices and a conference server 408. More particularly, a first participant (A) joins the conference session by sending a request 412 using a first participant device and receiving an acknowledgment from server 408 (step 414). Similarly, a second participant (B) joins the conference session by sending a request 416 using a second participant device and receiving an acknowledgment from server 408 (step 418) and a third participant (C) joins the conference session by sending a request 420 using a third participant device and receiving an acknowledgment from server 408 (step 422). Although illustrated with three active participants 402-406, methods can be used by any suitable number of one or more participants and respective devices. Once participants join a conference, they may view a graphical user interface, such as graphical user interface 500.

In the example, a missing participant (D) was not invited to the conference or may have indicated that he/she is not available for at least a portion of the conference session. In this case, a query bucket is initiated for the missing participant by one of the active participants or (e.g., automatically) by server 408 (steps 424, 426). An indicium 510 of the query bucket that is created can be visible to all active participants using graphical user interface 500.

During the conference session, one or more active participants 402-406 can add a query to the query bucket (step 428, 430), and the query bucket can be pushed to server 408 and saved on server 408 (steps 432, 434).

A determination as to an availability of and/or best mode to reach the missing participant can be made during step 436. For example, SIP and/or lightweight directory access protocol (LDAP) can be used during this step to determine a mode to send a notification containing a link to the query bucket. Additionally or alternatively, an available communication means of a missing participant device can be determined.

Once a mode of sending the notification is determined, a notice including a link to the query bucket is sent to the missing participant (step 438). The queries can be sent as email, instant message (IM), SMS, audio clip, or the like to the other party—e.g., depending on the form of availability of the missing participant. The query bucket can be maintained in the cloud. This helps the answerer, for whom the query bucket is targeted, to access the bucket from any location and/or suitable device.

The missing participant can then enter a response in the query bucket (Step 440) and the conference server can update the query bucket context (Step 442), and an indicium that the query bucket has been updated can be displayed to active participants 402-406 (step 444-448).

As mentioned above, FIG. 5 illustrates a graphical user interface in accordance with exemplary embodiments of the disclosure. Graphical user interface 500 includes an indicium for each active participant 5-2-505. The indicium can include a different color than a color used to indicate missing participants or participants in virtual present mode and/or may include a filled circle 518 (as illustrated) or the like. Similarly, a missing participant can be indicated by an indicium—e.g., a different color or empty circle 520, and/or by inclusion of indicium 510 for a query bucket. Graphical user interface 500 also includes a common area 512, that can be used to display the person talking or an image thereof, and/or to display other media, such as a presentation.

Graphical user interface 500 can also include a button 514 to add another participant to the conference and/or indicium 516 to indicate an availability (e.g., time) of a missing participant to be available as an active participant during the conference session.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

I claim:

1. A communication system comprising:
    a communication network comprising a conference server;
    one or more active participant devices coupled to the communication network during a conference session; and
    one or more missing participant devices coupled to the communication network during the conference session, wherein the one or more missing participant devices do not participate in at least a portion of the conference session,
    wherein, during the conference session, the conference server determines that at least one of the one or more missing participant devices will not participate in the at least the portion of the conference session and, in response, generates or causes to be generated a plurality of query buckets, including a query bucket for each of the at least one of the one or more missing participant devices,
    wherein presence information for one or more missing participants corresponding to the one or more missing participant devices is presented to one or more of the one or more active participant devices and a link to each missing participant query bucket is provided to the corresponding one or more missing participant devices;
    wherein each query bucket is displayed on the one or more active participant devices,
    wherein the conference server receives a query from one or more active participant devices and pushes the query to at least one of the one or more missing participant devices in real time, and
    wherein, during the conference session, the conference server receives a response to the query from the at least one of the one or more missing participant devices and pushes the response to each of the one or more active participant devices while the at least one of the one or more missing participant devices continues to not participate in the at least the portion of the conference session.

2. The communication system of claim 1, wherein each of the one or more active participant devices can be used to send the query.

3. The communication system of claim 1, wherein each of the one or more missing participant devices can be used to send a query.

4. The communication system of claim 1, wherein the conference server determines whether one or more devices are an active participant device or a missing participant device and automatically sends an invitation to the missing participant device to participate in the conference session in virtual mode.

5. The communication system of claim 1, wherein at least one of the one or more active participant devices comprises a graphical user interface to display an active participant indicium for each of the one or more active participant devices and a virtual participant indicium for each of the one or more missing participant devices showing when the virtual participant will be available during the conference session in a virtual presence mode.

6. The communication system of claim 1, wherein a query bucket of the plurality of query buckets automatically opens when the missing participant logs into the conference session and becomes an active participant.

7. A communication method comprising the steps of:
using a conference server, establishing a conference session to one or more active participant devices;
determining presence information for a missing conference participant;
presenting the presence information to an active participant;
using the conference server, creating a query bucket for each of a plurality of missing conference participants, including the missing conference participant, wherein each query bucket is initiated by the active participant or automatically by the conference server based on the presence information, and wherein each query bucket is visible to one or more active participants;
sending a link to each query bucket to the corresponding missing conference participant;
using one or more active participant devices, adding a query to at least one query bucket;
pushing the query to the conference server;
saving each query bucket on the conference server;
using the conference server, determining a communication method to use to send each query bucket to a corresponding missing participant device;
using the conference server, pushing the query to the corresponding missing participant device;
receiving at the conference server during the conference session, a response to the query from the corresponding missing participant device; and
using the conference server during the conference session, sending the response to the one or more active participant devices.

8. The communication method of claim 7, further comprising displaying each query bucket on each active participant device.

9. The communication method of claim 7, further comprising displaying each query bucket on the missing participant device.

10. The communication method of claim 7, further comprising assigning a corresponding query bucket to each participant of the conference session.

11. The communication method of claim 7, wherein the missing participant device participates in a plurality of conference sessions at one time.

12. The communication method of claim 7, wherein the step of determining presence information comprises using one or more of session initiated protocol (SIP) lightweight directory access protocol (LDAP), and other reachable means.

13. The communication method of claim 7, wherein the step of determining presence information comprises using one or more of session initiated protocol (SIP) lightweight directory access protocol (LDAP).

14. The communication method of claim 7, wherein the missing participant uses the missing participant device to directly participate during a first a portion of the conference session and to virtually participate during a second portion of the conference session.

15. The communication method of claim 7, further comprising displaying on at least one active participant device, an indicium of whether other participants are active participants or virtual participants.

16. The communication method of claim 7, further comprising displaying on at least one active participant device, an indicium of one or more of a time period and an amount of time a missing participant will participate directly in the conference session.

17. The communication method of claim 7, further comprising creating a query bucket for a non-invited participant to the conference session.

18. A communication method comprising the steps of:
using a conference server, establishing a conference session to one or more active participant devices;
using an active participant device, requesting a missing participant participate in the conference session in virtual presence mode;
using a missing participant device, accepting an invitation to a first portion of the conference session;
determining presence information for a missing participant;
presenting the presence information to an active participant;
using the conference server, automatically creating a query bucket for the missing participant;
sending a link to the query bucket to the missing participant;
using one or more active participant devices, adding a query to the query bucket;
using the conference server, determining a communication method to use to send one or more of the query bucket and a link to the query bucket to a missing participant device;
using the conference server, pushing the query to the missing participant device;
receiving at the conference server during the conference session, a response to the query from the missing participant device; and
using the conference server during the conference session, sending the response only to the active participant device.

* * * * *